(12) United States Patent
Fnineche et al.

(10) Patent No.: US 9,263,874 B2
(45) Date of Patent: Feb. 16, 2016

(54) GAS-INSULATED ELECTRICAL EQUIPMENT COMPRISING AT LEAST ONE GRADING SHIELD FOR ENSURING CONVECTION EXCHANGE

(75) Inventors: Chakib Fnineche, Saint Pierre d'Allevard (FR); Jean-Alain Rodriguez, Lyons (FR)

(73) Assignee: ALSTOM TECHNOLOGY LTD., Baden (CH)

( * ) Notice: Subject to any disclaimer, the term of this patent is extended or adjusted under 35 U.S.C. 154(b) by 164 days.

(21) Appl. No.: 13/881,197

(22) PCT Filed: Oct. 26, 2011

(86) PCT No.: PCT/EP2011/068777
§ 371 (c)(1),
(2), (4) Date: Jul. 26, 2013

(87) PCT Pub. No.: WO2012/055923
PCT Pub. Date: May 3, 2012

(65) Prior Publication Data
US 2013/0292153 A1    Nov. 7, 2013

(30) Foreign Application Priority Data

Oct. 27, 2010    (FR) ...................................... 10 58839

(51) Int. Cl.
*H02G 15/00*    (2006.01)
*H02G 15/02*    (2006.01)
(Continued)

(52) U.S. Cl.
CPC .......... *H02G 15/064* (2013.01); *H01H 33/7046* (2013.01); *H01H 2033/888* (2013.01)

(58) Field of Classification Search
CPC .......... H02B 13/02; H02B 1/20; H01H 33/24; H01H 33/74; H01H 2033/888

USPC ........ 174/78, 99 B, 104, 654; 218/51, 52, 77, 218/147; 361/604, 612, 619
See application file for complete search history.

(56) References Cited

U.S. PATENT DOCUMENTS 3,026,394 A * 3/1962 Jennings .......... H01H 33/66207
                                                      218/118
3,725,623 A * 4/1973 Fischer et al. ................... 218/69
(Continued)

FOREIGN PATENT DOCUMENTS

CH        470068 A    3/1969
CN     101030501 A    9/2007
(Continued)

OTHER PUBLICATIONS

International search report for PCT/EP2011/068777 dated Jun. 1, 2012.
(Continued)

*Primary Examiner* — Chau N Nguyen
*Assistant Examiner* — Roshn Varghese
(74) *Attorney, Agent, or Firm* — Pearne & Gordon LLP

(57) ABSTRACT

A gas-insulated substation having an enclosure filled with dielectric gas under pressure, comprising one electrical conductor (1) designed to be live that is of longitudinal axis (X) and placed inside the enclosure (6), and two grading shields (10, 12) surrounding in part the conductor (1), at least one of the grading shields (10) comprising a hollow electrically conductive body (14) of longitudinal axis that is substantially coaxial with the axis of the casing (6), said body (14) comprising an annular depression (22) in its outer surface and orifices (26) passing through said body (14) made in a bottom of said annular depression. Said orifices (26) ensure that the dielectric gas flows between an inside zone and a zone that is outside the grading shield (10) by convection exchange.

16 Claims, 5 Drawing Sheets

(51) Int. Cl.
*H02G 15/08* (2006.01)
*H02G 3/18* (2006.01)
*H02B 5/00* (2006.01)
*H02B 1/20* (2006.01)
*H02B 7/00* (2006.01)
*H01H 33/00* (2006.01)
*H01H 33/70* (2006.01)
*H01H 9/30* (2006.01)
*H01H 33/02* (2006.01)
*H01H 33/08* (2006.01)
*H02G 15/064* (2006.01)
*H01H 33/88* (2006.01)

(56) References Cited

U.S. PATENT DOCUMENTS

| | | | |
|---|---|---|---|
| 3,946,180 A | 3/1976 | Votta et al. | |
| 7,022,922 B2 * | 4/2006 | Nowakowski | 218/154 |
| 8,063,335 B2 * | 11/2011 | Grieshaber et al. | 218/157 |
| 2004/0256361 A1 | 12/2004 | Nowakowski | |
| 2007/0158310 A1 | 7/2007 | Grieshaber | |
| 2008/0271749 A1 | 11/2008 | Freer | |
| 2010/0096363 A1 * | 4/2010 | Ye et al. | 218/157 |

FOREIGN PATENT DOCUMENTS

| | | |
|---|---|---|
| CN | 101675509 A | 3/2010 |
| CN | 201449932 U | 5/2010 |
| DE | 2911633 A1 | 9/1980 |
| WO | 2007/014865 A1 | 2/2007 |

OTHER PUBLICATIONS

Office Action issued in Chinese Patent Application No. 201180052924.0 dated Dec. 24, 2014.

Office Action issued in Chinese Patent Application No. 201180052924.0 dated Aug. 24, 2015.

* cited by examiner

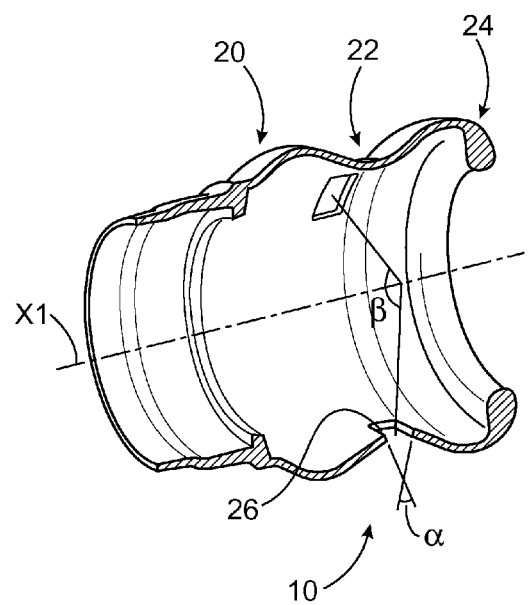
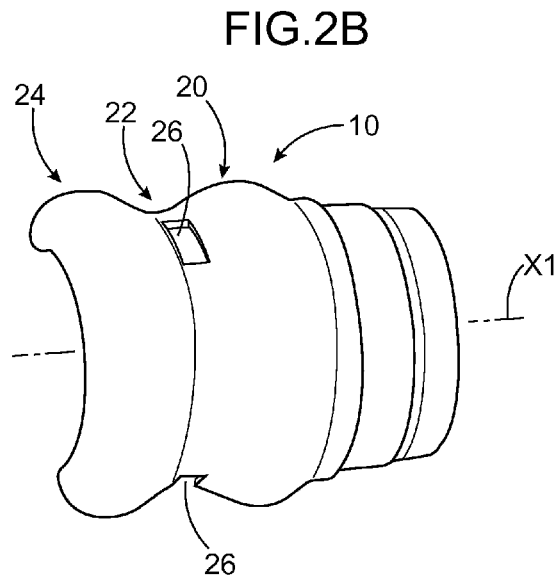
FIG.2A  FIG.2B
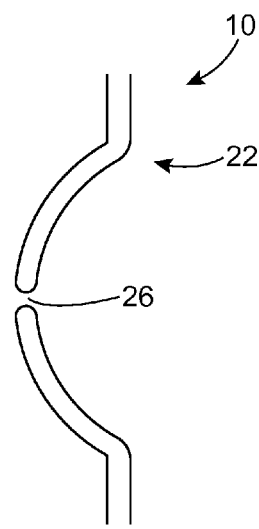
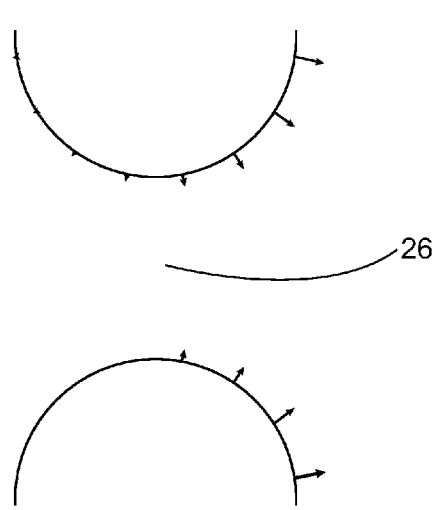
FIG.3A  FIG.3B

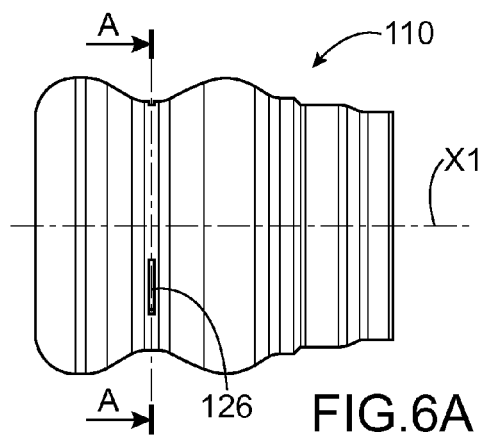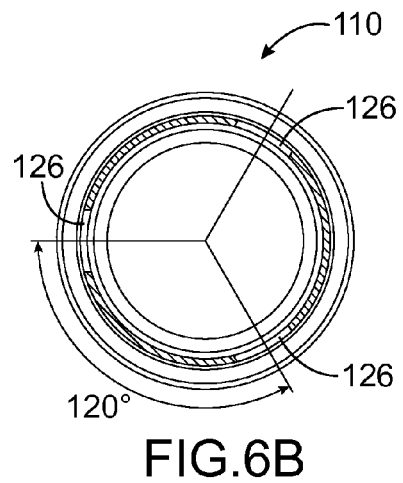
FIG.6A   FIG.6B
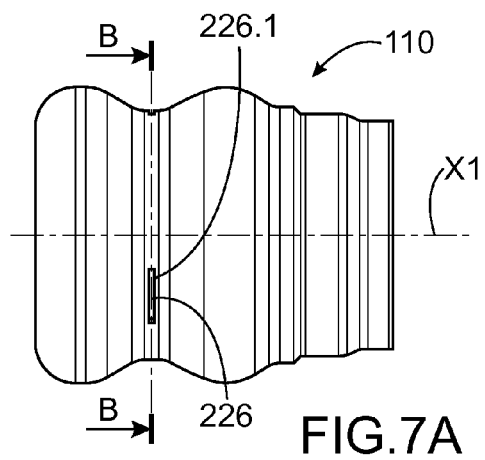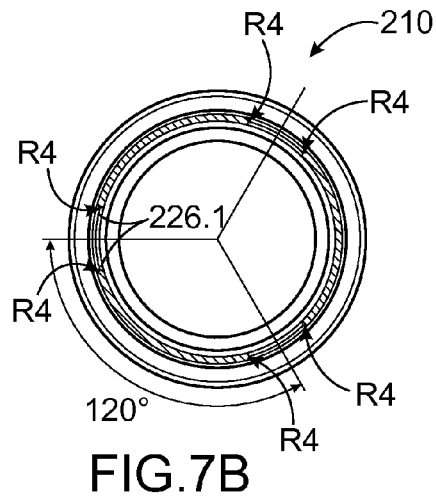
FIG.7A   FIG.7B
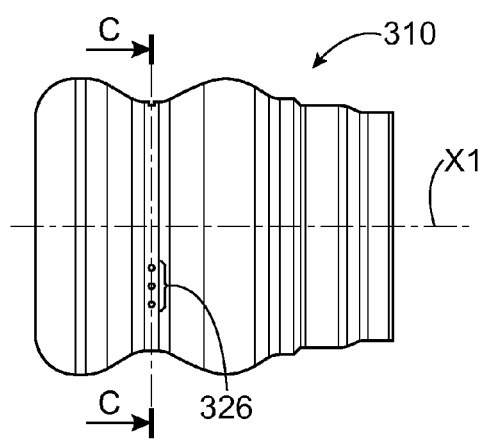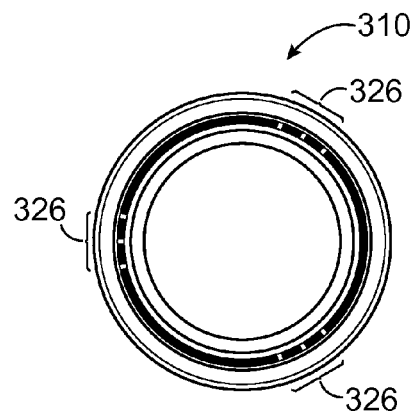
FIG.8A   FIG.8B

GAS-INSULATED ELECTRICAL EQUIPMENT COMPRISING AT LEAST ONE GRADING SHIELD FOR ENSURING CONVECTION EXCHANGE

TECHNICAL FIELD AND PRIOR ART

The present invention mainly relates to medium-, high-, or very high-voltage gas-insulated electrical equipment having a metal enclosure filled with a dielectric fluid of the gaseous sulfur hexafluoride ($SF_6$) type and more particularly to gas-insulated equipment provided with grading shields that make it possible to control electric field gradients.

The metal enclosure of gas-insulated electrical equipment, such as power or current transformers, metal-clad circuit breakers, and gas-insulated substations, with movable or stationary parts, is connected to ground and therefore has an electric potential of 0 Volts (V).

The conductive portion of the equipment is at several hundred kilovolts and is isolated from the outer casing by a dielectric fluid of the gas type, such as $SF_6$, or of the liquid type, such as oil.

There therefore exist considerable voltage gradients within the equipment. More particularly, at zones presenting a sharp shape or more generally a point, a stress concentration or "point" effect appears, i.e. at the point the electric field tends towards infinity, and that contributes to ionizing gas and thus possibly to striking an electric arc.

For that, it is known to dispose shields around high- or medium-voltage conductors at said sharp zones, said shields are known as grading shields, are of cylindrical shape, and they cover said zones in order to avoid said point effect. The shield is made of metal and is at the same voltage as the electrical equipment.

By way of example, grading shields cover the mechanisms designed for moving a movable contact, said mechanisms comprise rods, or any element forming a projection that risks striking an arc because of the considerable electrical field at said projection.

This grading shield surrounds the high- or medium-voltage conductor and is located at a given distance therefrom, said distance depending on the need to pass a tool for mounting or for maintenance through the grading shield and the high- or medium-voltage conductor and/or the presence of rods for moving a movable portion.

Electrical equipment provided with such a shield is described in Document EP 2 144 263, and the grading shield makes it possible to improve the uniformity of the distribution of the electric field gradient and thus to avoid point effects. That shield provides complete satisfaction.

In addition to the dielectric stresses, overheating appears in the electrical equipment. So as to limit said overheating it is preferable to avoid confining the dielectric gas. However, the presence of grading shields encourages such confinement.

Consequently, an object of the present invention is to provide a grading shield that improves the uniformity of the distribution of the electric field gradient, while avoiding confining gas, so as to provide electrical equipment that is safe to operate.

SUMMARY OF THE INVENTION

The above-mentioned object is reached by a grading shield comprising a hollow body designed for surrounding an electrical conductor, comprising at least one through passage that passes radially through the body, said through passage being made in the bottom of an annular depression of the shield.

In other words, convective exchanges are ensured between the hotter gas situated in the shield and the cooler gas situated outside the shield, while also ensuring good resistance to dielectric stress by means of said passage being implanted in a potential well.

The presence of orifices in the shield, which is generally unfavorable in terms of dielectric strength, is compensated by the orifices being located in a depression forming a potential well.

The electric field gradient at the edge of an orifice is particularly reduced by means of the invention, being at least halved relative to an electric field gradient at the edge of an orifice in a zone of constant diameter of the shield.

Preferably, the shield comprises a plurality of orifices distributed angularly in at least one plane perpendicular to the longitudinal axis of the shield.

Preferably, the edges of the orifice present a radius of curvature that makes it possible to reduce even further the electric field at the edges of the orifice.

In the present application, the terms "annular depression" or "annular boss" refer respectively to a recess profile or a projecting profile on the outer surface of the shield, which profile is closed around the longitudinal axis of the shield, the shield having a tubular shape of section that is not necessarily circular and that may vary along its axis. Consequently, the adjective "annular" does not refer exclusively to a circular ring shape, but to any closed shape.

The present invention thus provides a gas-insulated substation having an enclosure filled with dielectric gas under pressure, comprising at least one electrical conductor designed to be live that is of longitudinal axis and placed inside the enclosure, and at least one grading shield surrounding at least one longitudinal fraction of said conductor, said grading shield comprising a hollow electrically conductive body of longitudinal axis that is substantially coaxial with the axis of the enclosure, said body comprising at least one annular depression in its outer surface and at least one orifice passing through said body in order to ensure that the dielectric gas flows between an inside zone and a zone that is outside the grading shield, said orifice being made in a bottom of said annular depression.

In an advantageous example, the substation comprises a plurality of orifices in said bottom of the annular depression, distributed about the longitudinal axis. More particularly, it may comprise three orifices or three groups of orifices disposed at 120° from one another about the longitudinal axis.

In a particular example, the conductor is substantially horizontal and an orifice or a group of orifices is disposed in a bottom portion of the grading shield and two orifices or two groups of orifices are disposed in a top portion of the grading shield, advantageously the two orifices or groups of orifices of the top portion are disposed symmetrically relative to a vertical plane containing the longitudinal axis.

Advantageously, the annular depression presents a radius of curvature.

In a characteristic of the electrical equipment, the grading shield comprises a free end provided with an annular flange surrounding the conductor.

According to another characteristic, the grading shield comprises two annular bosses, each presenting a radius of curvature, disposed axially on either side of the annular depression, the sides of the annular depression being formed for one by the side of said bosses and for the other by the side of the other of said bosses.

The body of the grading shield presents a thickness that is substantially constant except at its free end.

Preferably, the radii of curvature of the first and second bosses are substantially equal, the minimum distance between the grading shield and the enclosure being defined by the outside diameter of the bosses.

The second boss and the free end of the shield advantageously form a continuous profile.

In preferred manner, the edges of the orifices present a convex profile.

By way of example, the body of the grading shield has a cross-section that is circular.

By way of example, the orifices may have a flow section that is circular.

In an embodiment, the electrical conductor comprises two contact elements, at least one of the contact elements being movable along a longitudinal axis, said contact elements being designed to come into contact, said grading shield surrounding said at least one movable contact element at least in part, and said substation comprising a second grading shield surrounding the second contact element at least in part.

BRIEF DESCRIPTION OF THE DRAWINGS

The present invention can be better understood from the following description and the accompanying drawings, in which:

FIGS. 2A and 2B are inside and outside views respectively of the shield in the example shown in FIG. 1A;

FIG. 3A is a view of a diagrammatic detail of a shield at an orifice;

FIG. 3B is a diagram of the edge of the orifice of FIG. 3A in which the surface electric field gradients are shown;

FIGS. 6A and 6B are a side view and a view in cross-section along a plane A-A of an embodiment of a shield;

FIGS. 7A and 7B are a side view and a view in cross-section along a plane B-B of a preferred variant of the shield shown in FIGS. 6A and 6B;

FIGS. 8A and 8B are a side view and a view in cross-section along a plane C-C of a preferred variant of the shield;

DETAILED DESCRIPTION OF PARTICULAR EMBODIMENTS

For reasons of simplicity and clarity, the description below relates mainly to a gas-insulated circuit breaker in order to explain the invention, but it should naturally be understood that the present invention applies to any medium- high-, or very high-voltage electrical equipment that is gas-insulated.

The present invention applies to all electrical equipment comprising an outer casing or tank and live inside elements and for which there exist differences in voltage between the outer casing and the inside elements, the live elements being surrounded by one or more grading shields.

The electrical equipment to which the invention applies may be power transformers, current transformers, gear having sets of busbars, with or without movable parts, and any switch designed to break a medium-, high-, or very high-voltage current.

Figure 1A:
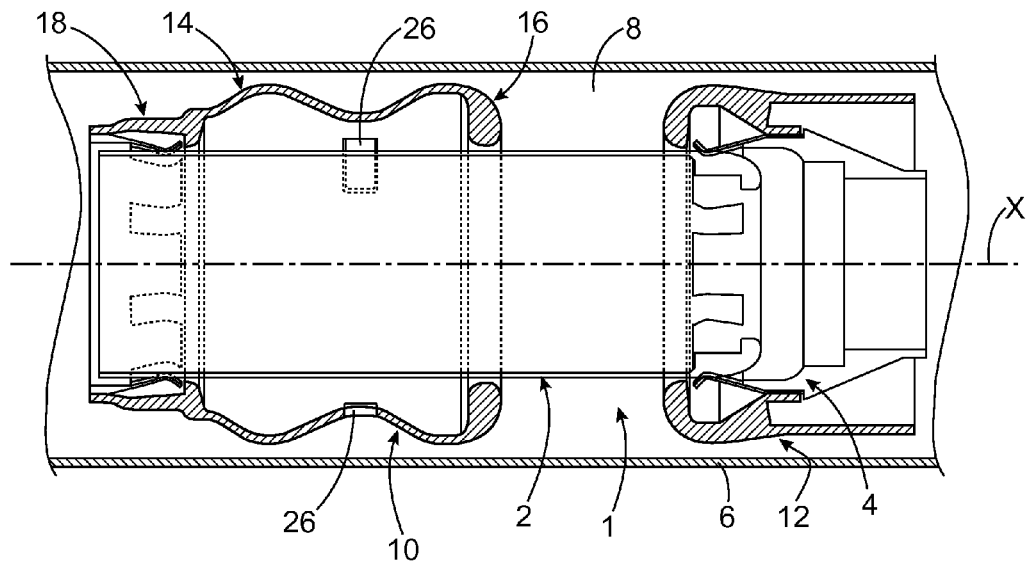
FIG. 1A is a diagrammatic longitudinal section view of an embodiment of electrical equipment of the present invention.

FIG. 1A shows a longitudinal section view of an embodiment of a circuit breaker of the present invention comprising a live electrical conductor 1 extending along a longitudinal axis X, and a metal tank 6 confining the electrical conductor 1 in leaktight manner. This volume 8 is filled with an electrically insulating fluid. Said fluid may be a gas, commonly it may be sulfur hexafluoride ($SF_6$), or it may be a liquid, e.g. oil.

The tank 6 is connected to ground, it therefore has a potential of zero.

In this example, it is considered that the various parts described are cylindrical in shape about the axis X, but this is in no way limiting, and any part having some other shape remains within the ambit of the present invention.

In the example shown, the electrical conductor 4 is designed to conduct electricity in normal operation and to break its flow in the event of an incident. To do this, it comprises two contact elements 2, 4 that are suitable for being separated from each other by a distance that is sufficient. Provision is made for one of the two elements 2, 4 to be movable axially so as to move apart from the other conductor element. Here the movable contact element is the contact element 2.

The circuit breaker also comprises first and second grading shields 10 and 12. The grading shields 10, 12 are made of electrically conductive material, e.g. metal. By way of example, the first grading shield 10 surrounds a portion of the first contact element 2 and the second grading shield 12 surrounds the stationary contact element 4.

In the example shown, the grading shields 10, 12 are of circular section, but that is in no way limiting, provision could be made for shields of prismatic or elliptical section, or even shields presenting no axis of symmetry.

It is also considered that the shields 10, are electrically connected to the contact elements 2, 4, and therefore have the same potential as the contact elements. Grading shields having the potential of the outer casing 6 are also within the ambit of the present invention.

The first and second grading shields 10, 12 surround the contact elements 2 and 4 respectively with clearance, and extend over at least a portion of the length of contact elements 2 and 4.

In the example shown, the circuit breaker comprises two different grading shields, the second grading shield 12 presents a tubular body of constant diameter that provides compactness that is adapted to the structure of the electrical equipment. However, electrical equipment comprising two identical grading shields does not go beyond the ambit of the present invention.

The grading shield 10 is described in detail below.

The grading shield 10 comprises a hollow body 14 extending along a longitudinal axis X1. The grading shield 10 comprises a first longitudinal end 16 oriented towards the contact element 4 and a second longitudinal end 18 oriented away from the contact element 4.

In the rest of the description the longitudinal end 16 of the grading shield 10 oriented towards a central zone of the volume 8 is referred to as the "proximal end", and the longitudinal end 18 oriented away from said central zone as the "distal end".

The movable contact element 2 comprises a stationary portion 2.1 and a movable portion 2.2 mounted to slide in the stationary portion 2.1 along the axis X of the electrical equipment. The movable portion 2.2 ensures electrical contact between the stationary portion 2.1 and the contact element 4. The movable portion 2.2 is connected to the control mechanism for controlling movement of the movable contact element 2.

The distal end 18 of the shield 10 is mounted in stationary manner on the stationary portion 2.1 of the contact element 2. In the example shown, the stationary portion 2.1 penetrates into the distal end 18 of the grading shield 10. Thus, the grading shield 10 predominantly surrounds the movable portion 2.2 of the contact 2.

In outline, the body 14 of the first grading shield 10 comprises, from its distal end to its proximal end, a first fraction I in the form of a sleeve of substantially constant diameter, a second fraction II with a cross-section of increasing diameter, a third fraction III with a cross-section of decreasing diameter, and a fourth fraction IV with a cross-section of increasing diameter, and a fifth fraction V forming a ring of substantially constant inside diameter.

The fraction I in the form of a sleeve is fitted over the stationary portion 2.1 of the contact element 2.

Figure 1B:
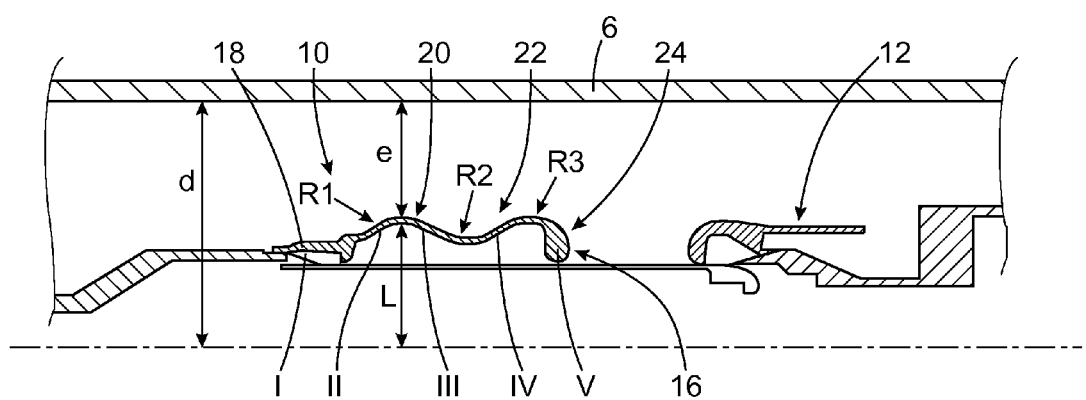
FIG. 1B is a diagrammatic view of the electrical equipment of FIG. 1A in which the dimensions are given.

As shown in the diagram in FIG. 1B, the connection zone 20 between the second and third fractions forms an annular boss presenting a radius of curvature R1, the connection zone 22 between the third and fourth fractions forms an annular depression with a radius of curvature R2, and the connection zone 24 between the fourth and the fifth fractions forms an annular boss with a radius of curvature R.

In a variant, provision could be made for the depression to present a bottom formed by a cylinder of circular section.

The proximal end 16 of the shield also presents a radius of curvature R3 so that it forms a continuous profile with the second boss, in order to avoid the presence of any square-edged zone likely to form a zone of dielectric stress concentration.

d is the distance between the inside radius of the tank and the longitudinal axis X of the tank.

L is the largest radius of the grading shield.

e is such that e=d−L, e being the minimum distance between the outer surface of the shield and the inside surface of the tank in order not to exceed the critical value of the electric field that may lead to no behavior to dielectric strength. This electric field value, and therefore the value of e, is on the basis of the form factor, of the voltage level, of the nature of the gas, and of the pressure of said gas.

The grading shield 10 also comprises, at the bottom of the depression zone 22, at least one orifice 26, and in the example shown a plurality of orifices 26, forming passages passing through the shield and enabling fluids to communicate between the inside and the outside of the shield 10.

In the example shown in FIGS. 1A, 2A, and 2B, the orifices 26 are of rectangular section, distributed angularly around the axis X1, and of width that is parallel to the axis X1.

In advantageous manner, the orifices are distributed regularly around the longitudinal axis X1, ensuring convective exchanges through the entire periphery of the shield and all around the conductor.

In the example shown in FIG. 1A, the orifices are three in number, being distributed at 120° from one another around the axis X1.

This regular distribution is not limiting and shields with orifices distributed in non-regular manner come within the ambit of the present invention.

These orifices 26 form through passages for the dielectric gas, e.g. the $SF_6$, and ensure convective exchanges of gas between the inside and the outside of the shield.

The disposition in the bottom of the depression makes it possible to reduce the dielectric stress due to the presence of orifices in the shield, in particular due to the edges of the orifices.

In particularly advantageous manner, the shield, comprising three orifices at 120° from one another, is disposed in the enclosure of the electrical equipment of substantially horizontal longitudinal axis, in such a manner that an orifice is disposed in the bottom portion of the shield and the two other orifices are disposed in the top portion symmetrically relative to a vertical plane containing the axis X. The first orifice situated in the bottom portion makes it possible to produce a "Venturi" effect. It results in a higher speed of the fluid passing through said orifice, thus improving the gas flow. An opening of greater section is provided on the top portion. In the example shown, said opening of greater flow section is obtained by making a plurality of orifices, two in the example, each having a flow section equal to that of the orifice in the bottom portion. This embodiment is industrially very advantageous to manufacture.

Solely by way of example the shape of the shield may be selected as follows:

$$R1=R3$$

$$R1 \geq R2$$

$$R1/10 \leq R2 \leq R1.$$

And for the size of the orifices:
let S be the section of an opening, and
let n be the number of orifices such that $3 \leq n < 120$.

The n orifices are distributed on the circumference of the annular depression 22 with an angular pitch β (cf. FIG. 2A) such that $\beta = 2\pi/n$.

Each section S is defined by the product of a×b such that $a = \alpha \times R2$ (cf. FIG. 2A).

Since 0<R2<RMAX, RMAX is determined by the dielectric strength of the shield and by parameters of available space.

In addition, $0 < \alpha \leq \pi$.

For example, by taking: R2=10 millimeters (mm) and $\alpha = \pi/2$, a value of $a = \alpha \times R2 = \pi/2 \times 10 = 15.7$ mm is thus obtained With b such that $0 < b < 2\pi(L-R2)/n$.

FIGS. 6A and 6B show another implementation of a shield 110, in which the orifices 126 present a rectangular section of width that is very short relative to its length, e.g. its length is 40.1 mm while its width is 5 mm. The orifices 126 are distributed at 120° from one another. In this embodiment, the edges of the orifices present square edges.

FIGS. 7A and 7B show another advantageous implementation of a shield, in which the orifices 226 present rounded edges 226.1 so as to limit even further the dielectric stresses at the edges of the orifices. The edges 226.1 therefore present a radius of curvature defining a convex profile.

FIGS. 8A and 8B show another implementation of a shield 310, in which the orifices 326 have circular flow sections. In this example, the shield 310 comprises three groups of three orifices 326, the groups being distributed at 120° from one another around the axis X1.

Figure 9:
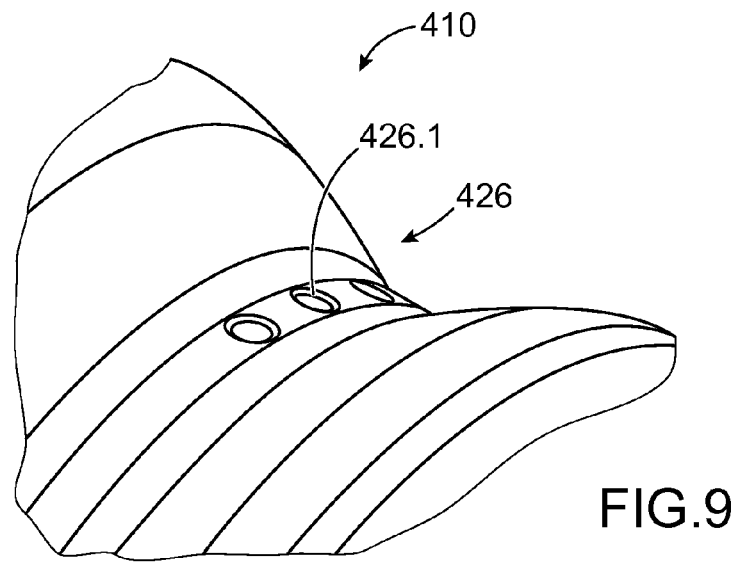
FIG. 9 is a perspective view from above of a preferred variant of the shield shown in FIGS. 8A and 8B.

FIG. 9 shows an advantageous variant of the shield 410 in FIGS. 8A and 8B in which the edges of the orifices 426 are rounded so as to eliminate the square edges and reduce the dielectric stresses.

Figure 4A:
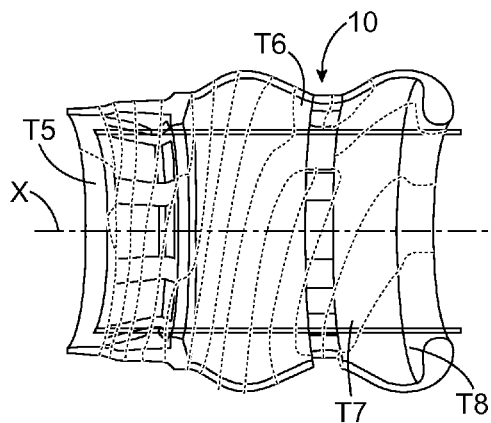
FIGS. 4A to 4C are temperature maps of various zones of the shield, the conductor, and the electrical equipment.
Figure 5A:
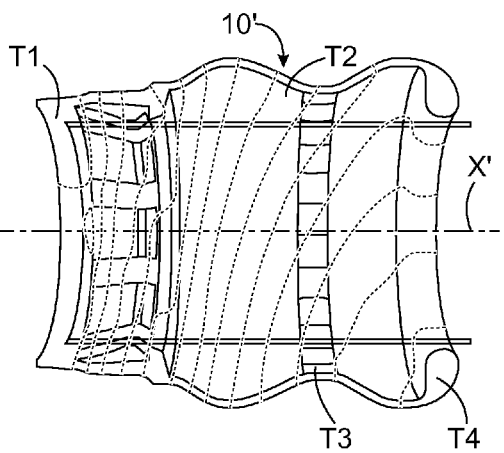
FIGS. 5A to 5C are temperature maps of various zones of a shield having no orifice, the conductor, and the electrical equipment provided with such a shield.
Figure 4B:
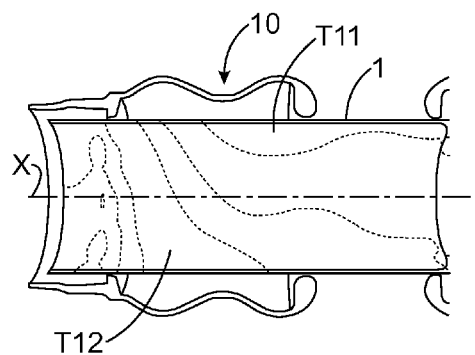
Figure 4C:
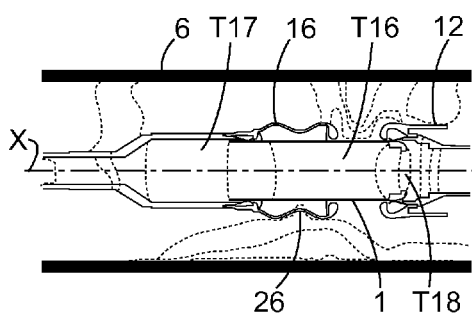

FIGS. 4A and 4B show a temperature map in a grading shield of the present invention and in the conductor 2 of electrical equipment of the present invention respectively. FIG. 4C shows a map of the electrical equipment of the present invention.

For comparison purposes only, the temperature maps were calculated for a grading shield 10' not comprising any orifice for ensuring convective exchanges.

The calculations were performed using ANSYS software for a current of 4000 amps (A).

In FIGS. 4A to 4C and 5A to 5C the temperature zones are defined diagrammatically. Some of these temperatures are shown.

In FIG. 4 the temperature of the shield lies in the range T8, substantially equal to 78° C., to T5, substantially equal to 85° C. At the depression provided with openings, the temperature lies in the range T7=79° C. to T6=81° C. For the shield in FIG. 5A, the temperature of the shield lies in the range T4, substantially equal to 81° C., to T1, substantially equal to 85° C. At the depression, the temperature lies in the range T3=82° C. to T2=84° C. The effect of the orifices on the temperature of the shield can thus be seen.

Figure 5B:
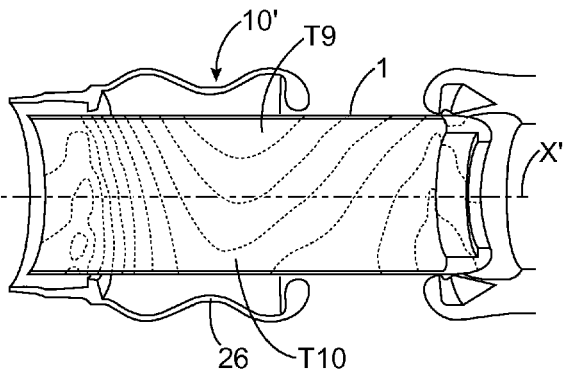

The effect of the presence of the orifices is even more remarkable when comparing the maps of the conductors shown in FIGS. 4B and 5B. In a conductor situated in a shield of the invention shown in FIG. 4B, the temperature of the conductor at the depression provided with openings lies in the range T12, substantially equal to 90° C., to T11, substantially equal to 92° C. In a conductor shown in FIG. 5B, the temperature of the conductor at the depression lies in the range T10, substantially equal to 96° C., to T9, substantially equal to 98° C.

Figure 5C:
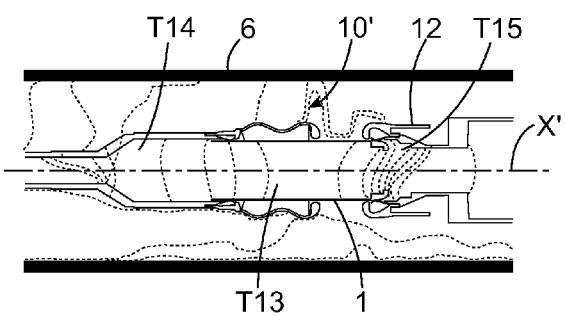

FIGS. 4C and 5C show, similarly, the temperature map of an example of electrical equipment of the invention in its entirety in which the temperature in the conductor is much less than the temperature in the conductor of electrical equipment in which the shield has no orifices. In FIG. 4C, the temperature lies in the range T17, T18 substantially equal to 87° C., to T16, substantially equal to 90° C. at the depression provided with openings. In FIG. 5C, the temperature at the depression lies in the range T14, T15, substantially equal to 89° C., to T13=95° C.

These temperature measurements are to be likened to voltage gradient values at the orifices.

In FIG. 3B arrows symbolize the voltage gradient values on the surface of the edges of an orifice 26 situated at the bottom of a depression 22. FIG. 3A shows in detail the shapes of the depression and of the orifice under consideration for performing the calculations.

It should be recalled that voltage gradient is equal to the ratio of the voltage difference between two equipotential lines divided by the distance between said two lines.

The maximum value of the voltage gradient on the edges of the orifice is 18.2344 volts per meter (V/m).

For comparison purposes when the orifice is not in a depression, the shield presenting a circularly cylindrical shape, the maximum voltage gradient value on the edges of the orifice would be 40.2548 V/m.

Consequently, the voltage gradient is halved by means of the present invention, this reduction of the gradient thus reduces the risk of striking an arc due to the presence of the orifices 26.

The operation of the orifices 26 is described below.

The conductor 1 is surrounded by the grading shield 10, the unit being surrounded by a dielectric fluid. The grading shield has the function of covering the zones that are likely to concentrate dielectric stresses and to give rise to an increase in the electric field gradient in this zone. However, the grading shield has the effect of confining the fluid around the conductor. When electricity is flowing in said conductor 1, heat is given off. As a result of confinement, the gas is heated. In addition, the fluid surrounding the shield is in contact with the wall of the tank, which is itself in contact with ambient air, the fluid is then at a temperature that is lower than that of the fluid between the conductor and the shield. The presence of the orifices 26 enables the inside and the outside of the shield to communicate. As a result of the temperature difference between the two zones, the fluid is set into movement by convection. This flow of fluid is maintained since the conductor continues to give off heat. Said flow of fluid therefore causes heat to be extracted from inside the shield, and thus cools the conductor.

By means of convective exchanges through the grading shield of the invention, overheating inside the shields is reduced, particularly in the conductors, and dielectric stresses are limited at said orifices by means of the disposition of the convection orifices at the bottom of depressions.

The grading shield of the present invention may comprise a plurality of annular depression zones, with all or only some of them being comprising convective orifices.

Figure 10:
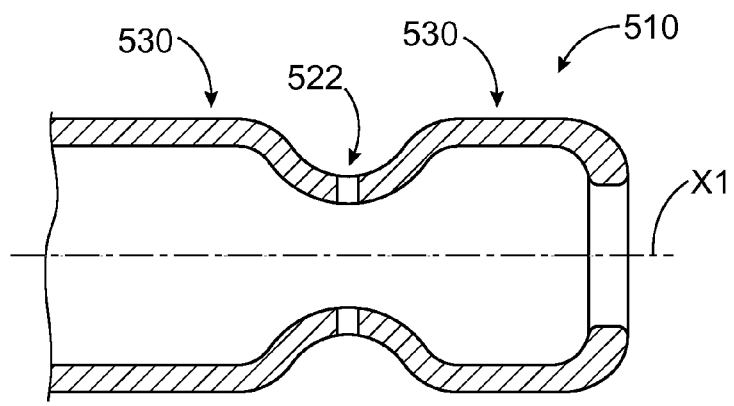
FIG. 10 is a longitudinal section view of another embodiment of a grading shield.

In the example shown in FIGS. 2A and 2B, the depression is situated axially between the two annular bosses, but this embodiment is in no way limiting, and the shield 510 shown in FIG. 10 is also within the ambit of the present invention. In this example, the shield comprises two tube fractions 530 of circular section on either side of an annular depression fraction 522. This example presents the advantage of being very simple.

By way of example, the embodiment of FIGS. 2A and 2B presents the advantage of limiting the diameter of the distal end of the shield. The inside diameter of the depression is substantially equal to that of the distal portion of the shield, whereas in FIG. 10, provision must be made for the end of the distal portion to be of greater diameter in order to be able to house the depression between the outside diameter of the shield and the conductor.

Figure 11:
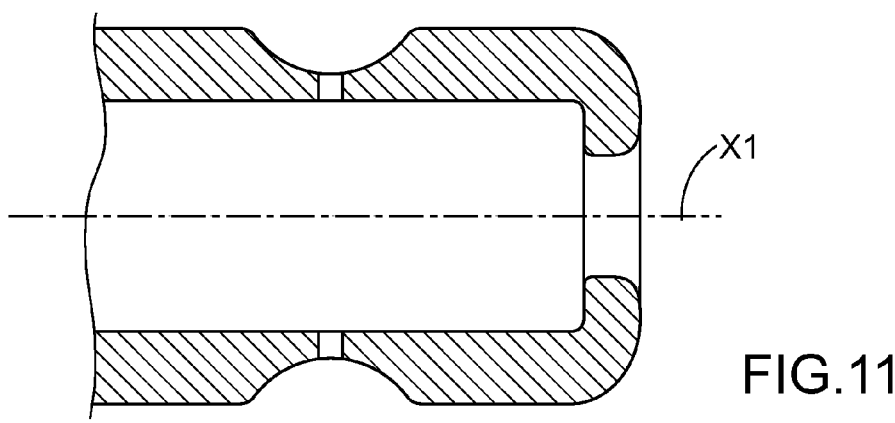
FIG. 11 is a longitudinal section view of another embodiment of a grading shield.

In a variant, and as shown in FIG. 11, provision may be made for the depression to be made by machining in the thickness of the body.

By way of example only, in the embodiment of FIGS. 6A and 6B for 4000 A, flow section dimensions of 40×5 mm$^2$ are proposed.

The shields of the present invention are made for example by forming, by machining . . . .

The invention claimed is:

1. A gas-insulated substation having an enclosure filled with dielectric gas under pressure, comprising:—at least one electrical conductor designed to be live that is of longitudinal axis and placed inside the enclosure, and—at least one grading shield surrounding at least one longitudinal fraction of said electrical conductor, said grading shield comprising a hollow electrically conductive body of longitudinal axis that is substantially coaxial with the longitudinal axis of the enclosure, said hollow electrically conductive body comprising at least one annular depression in its outer surface and at least one orifice passing through the hollow electrically conductive body in order to ensure that the dielectric gas flows between an inside zone and a zone that is outside the grading shield, said orifice being made in a bottom of said annular depression, wherein the annular depression comprises a concave profile that opens in a direction away from the longitudinal axis of the enclosure, wherein the grading shield comprises two annular bosses, each presenting a radius of curvature, the two annular bosses being disposed axially on either side of the annular depression, one side of the annular depression being formed by the side of one of the two annular bosses and another said of the annular depression begin formed by the side of the other of the two annular bosses.

2. The substation according to claim 1, comprising a plurality of orifices in said bottom of the annular depression, distributed about the longitudinal axis.

3. The substation according to claim 2, comprising three orifices or three groups of orifices (made in the bottom of the annular depression, said orifices being disposed at 120° from one another about the longitudinal axis.

4. The substation according to claim 3, wherein the electrical conductor is substantially horizontal and an orifice or a group of orifices (is disposed in a bottom portion of the grading shield (and two orifices or two groups of orifice are disposed in a top portion of the grading shield.

5. The substation according to claim 4, wherein the two orifices or groups of orifices of the top portion of the grading shield are disposed symmetrically relative to a vertical plane containing the longitudinal axis.

6. The substation according to claim 1, wherein the annular depression presents a radius of curvature.

7. The substation according to claim 1, wherein the grading shield comprises a free end provided with an annular flange surrounding the electrical conductor.

8. The substation according to claim 7, wherein the body of the grading shield presents a thickness that is substantially constant except at its free end.

9. The substation according to claim 8, wherein the radii of curvature of the two annular bosses are substantially equal, the minimum distance between the grading shield and the enclosure being defined by the outside diameter of the two annular bosses.

10. The substation according to claim 1, wherein the grading shield comprises two annular bosses, the two annular bosses presenting a radius of curvature and being disposed axially on either side of the annular depression, one side of the annular depression being formed by the side of one of the two annular bosses and another said of the annular depression begin formed by the side of the other of the two annular bosses.

11. The substation according to claim 10, wherein the radii of curvature of the two annular bosses are substantially equal, the minimum distance between the grading shield and the enclosure being defined by the outside diameter of the two annular bosses.

12. The substation according to claim 11, wherein one of the two annular bosses and the free end of the grading shield form a continuous profile.

13. The substation according to claim 1, wherein the edges of the orifices present a convex profile.

14. The substation according to claim 1, wherein the hollow electrically conductive body of the grading shield has a cross-section that is circular.

15. The substation according to claim 1, wherein the orifices have a flow section that is circular.

16. The substation according to claim 1, wherein the electrical conductor comprises a first and a second contact elements, at least the first contact element being movable along the longitudinal axis, said first and second contact elements being designed to come into contact, said grading shield surrounding said at first contact element at least in part, and said substation comprising a second grading shield surrounding the second contact element at least in part.

* * * * *

UNITED STATES PATENT AND TRADEMARK OFFICE
CERTIFICATE OF CORRECTION

PATENT NO.       : 9,263,874 B2
APPLICATION NO.  : 13/881197
DATED            : February 16, 2016
INVENTOR(S)      : Chakib Fnineche It is certified that error appears in the above-identified patent and that said Letters Patent is hereby corrected as shown below:

In the specification, column 4, line 39, please add --12-- between "shields10," and "are"

Signed and Sealed this
Twenty-sixth Day of July, 2016

Michelle K. Lee
*Director of the United States Patent and Trademark Office*